(12) United States Patent  
Kurita et al.

(10) Patent No.: US 6,930,477 B1  
(45) Date of Patent: Aug. 16, 2005

(54) ROTATION ANGLE DETECTION DEVICE

(75) Inventors: Kazuhisa Kurita, Tokyo (JP); Kenji Nakao, Tokyo (JP); Yoshihiko Onishi, Tokyo (JP); Manabu Miyaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/859,074

(22) Filed: Jun. 3, 2004

(30) Foreign Application Priority Data

Feb. 19, 2004 (JP) .......................... 2004-043070

(51) Int. Cl.⁷ .............................................. G01B 7/30
(52) U.S. Cl. ................. 324/207.25; 324/244; 324/252
(58) Field of Search ..................... 324/207.13, 207.2, 324/207.21–207.23, 207.25, 234–235, 244, 324/251, 173–174, 252; 73/514.31, 514.39; 123/612, 617

(56) References Cited

U.S. PATENT DOCUMENTS 5,055,781 A * 10/1991 Sakakibara et al. .... 324/207.21  
6,640,652 B2 * 11/2003 Kikuchi et al. ........ 73/862.333

FOREIGN PATENT DOCUMENTS

| DE | 40 14885 A1 | 11/1990 |
| DE | 41 23 131 A1 | 1/1993 |
| DE | 100 54 123 A1 | 5/2001 |
| EP | 1 103 573 A1 | 5/2001 |
| EP | 1 422 256 A1 | 5/2004 |
| JP | 9-72706 A | 3/1997 |
| JP | 11-94512 A | 4/1999 |
| JP | 2001-317909 A | 11/2001 |
| WO | WO 94/259366 A1 | 12/1994 |

* cited by examiner

Primary Examiner—Bot LeDynh  
(74) Attorney, Agent, or Firm—Sughrue Mion, PLLC

(57) ABSTRACT

A rotation angle detection device is simple in structure and is capable of reducing the size of a permanent magnet. The permanent magnet is fixedly secured to a rotating member. A first guide member is attached at one end face to an S pole side of the permanent magnet. A second guide member is attached at one end face to an N pole side of the permanent magnet, and has its tip end disposed in opposition to a tip end of the first guide member. A magnetoresistive member is disposed in a space between the tip ends of the first and second guide members, the magnetoresistive member being fixedly attached to a non-rotating member. An angle of rotation of the rotating member is detected by detecting a change of the azimuth of magnetic flux, which is generated by the permanent magnet in the space, by means of the magnetoresistive member.

10 Claims, 6 Drawing Sheets

ROTATION ANGLE DETECTION DEVICE

BACKGROUND OF THE INVENTION

1. Field of the Invention

The present invention relates to a rotation angle detection device for detecting the angle of rotation of an object to be detected by the use of a magnetoresistive member and a magnet.

2. Description of the Related Art

There has hitherto been known a rotation angle detection device in which a permanent magnet is mounted on an end portion of a rotation shaft, and a magnetoresistive sensor is arranged on an axis of the rotation shaft away from the permanent magnet and orthogonal to the rotation shaft, so that it can detect the angle of rotation of the rotation shaft in response to the magnetic flux generated by the permanent magnet in a direction orthogonal to the axis of the rotation shaft (for example, see a first patent document: Japanese patent application laid-open No. 11-94512).

In such a rotation angle detection device, however, there is the following problem. That is, the majority of the magnetic flux generated by the permanent magnet leaks outside an area in which the magnetoresistive sensor is sensitive or responsive, and hence the permanent magnet itself is required to generate a higher magnetic flux density, thus resulting in an increased size and higher cost.

SUMMARY OF THE INVENTION

Accordingly, the present invention is intended to obviate the above-mentioned problem, and has for its object to provide a rotation angle detection device which is simple in structure and which is capable of reducing the size of the permanent magnet and the cost of manufacture.

Bearing the above object in mind, according to the present invention, there is provided a rotation angle detection device which includes: a permanent magnet fixedly secured to a rotating member, and having an S pole side face and an N pole side face; a first guide member having its one end face fixedly attached to the S pole side face of the permanent magnet; and a second guide member having its one end face fixedly attached to the N pole side face of the permanent magnet, and having its tip end disposed in opposition to a tip end of the first guide member. A magnetoresistive member is disposed in a space formed between the tip end of the first guide member and the tip end of the second guide member, the magnetoresistive member being fixedly attached to a non-rotating member. An angle of rotation of the rotating member is detected by detecting a change of the azimuth of magnetic flux, which is generated by the permanent magnet in the space, by means of the magnetoresistive member.

In the rotation angle detection device as constructed above according to the present invention, the magnetic flux generated by the permanent magnet passes through the magnetoresistive member while being guided by the first and second guide members, whereby the leakage of the magnetic flux to areas other than the magnetoresistive member can be reduced, and hence the size of the permanent magnet can be accordingly reduced.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
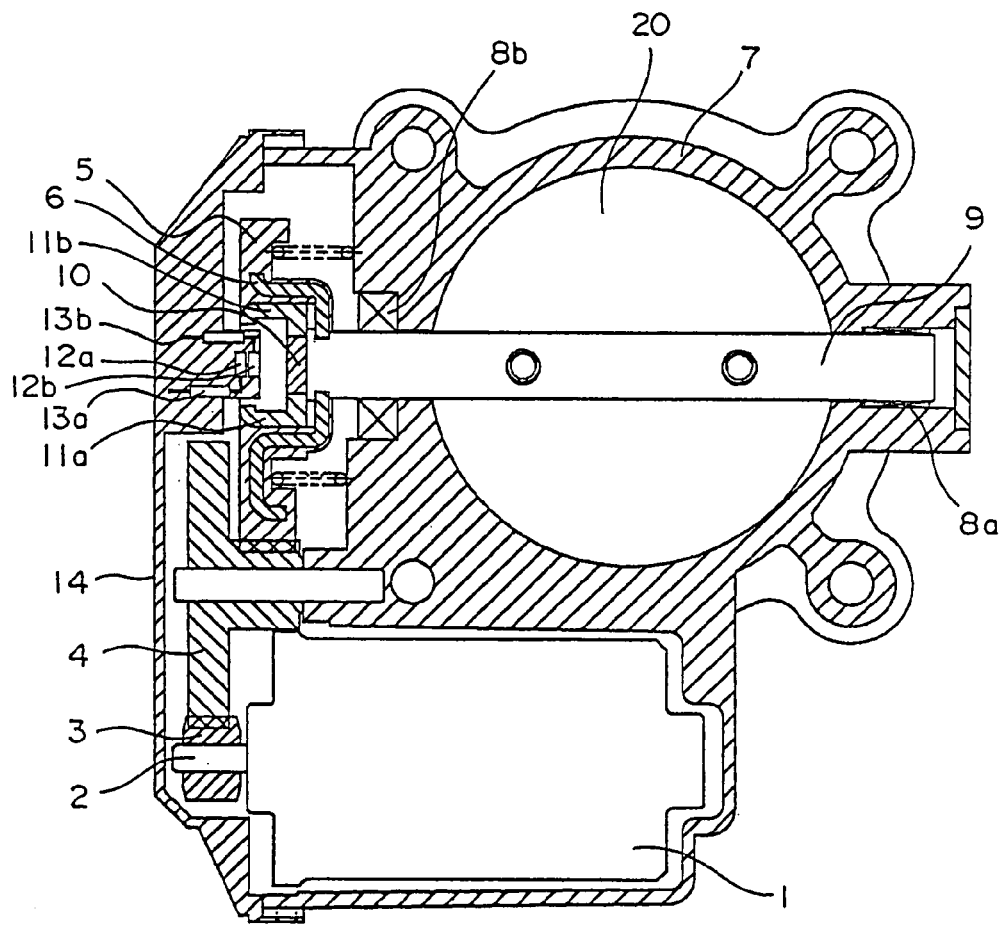
FIG. 1 is a cross sectional side elevational view showing an intake air control apparatus for an engine with a rotation angle detection device according to a first embodiment of the present invention being built therein.

Now, preferred embodiments of the present invention will be described in detail while referring to the accompanying drawings. Throughout the following embodiments and figures of the present invention, the same or corresponding members or parts are identified by the same reference numerals and characters.

Embodiment 1

Figure 2:
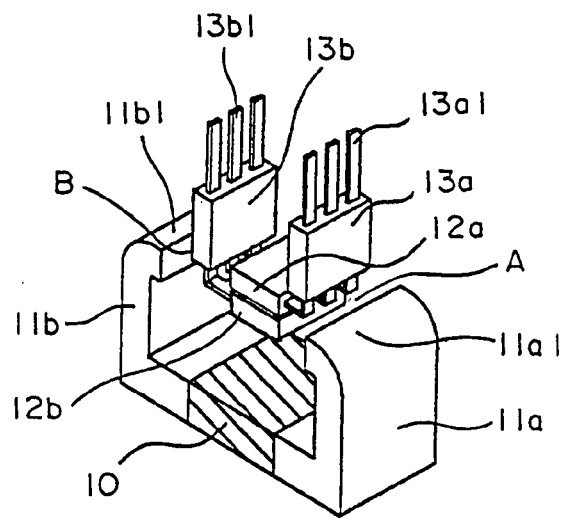
FIG. 2 is a perspective view of the rotation angle detection device shown in FIG. 1.

FIG. 1 is a cross sectional side elevational view that shows an intake air control apparatus for an engine (hereinafter simply referred to as "intake air control apparatus") into which a rotation angle detection device constructed according to a first embodiment of the invention is built. FIG. 2 is a perspective view of the rotation angle detection device shown in FIG. 1.

In the intake air control apparatus of this embodiment, a motor spur gear 3 is fixedly mounted on a rotation or output shaft 2 of a drive motor 1 which is driven to rotate by direct current supplied thereto from an electric power supply (not shown). The motor spur gear 3 is in meshing engagement with an intermediate gear 4 made of resin, which is in turn in meshing engagement with a sector-shaped final spur gear 5 made of resin. A cup-shaped insert member 6 made of a non-magnetic material is embedded in the final spur gear 5. The insert member 6 is fixedly secured to an end portion of a rotating body or member in the form of a shaft 9. The shaft 9 is rotatably supported on a body 7 through a first bearing 8a and a second bearing 8b. A throttle valve 20 is fixedly mounted on the shaft 9.

A rectangular-shaped permanent magnet 10 is fixedly secured to an end face of the shaft 9 near the second bearing 8b. A first guide member 11a and a second guide member 11b both of an L-shaped configuration are fixedly secured to the opposite end faces of the permanent magnet 10, respectively. The first guide member 11a and the second guide member 11b both of the same shape are integrally formed with the final spur gear 5. A first magnetoresistive member 12a and a second magnetoresistive member 12b are superposed or overlapped with each other in a space between a tip end 11a1 of the first guide member 11a and a tip end 11b of the second guide member 1b. The first magnetoresistive member 12a and the second magnetoresistive member 12b, being arranged in a pair as a failsafe, are connected with a first arithmetic circuit member 13a and a second arithmetic circuit member 13b, respectively. The first magnetoresistive member 12a, the second magnetoresistive member 12b, the first arithmetic circuit member 13a and the second arithmetic circuit member 13b are integrally formed by insert molding with a housing 14 that is fixedly attached to the body 7 so as to cover the motor spur gear 3, the intermediate gear 4 and the final spur gear 5.

The above-mentioned rotation angle detection device is composed of the permanent magnet 10, the first guide member 11a, the second guide member 1b, the first magnetoresistive member 12a, the second magnetoresistive member 12b, the first arithmetic circuit member 13a and the second arithmetic circuit member 13b.

Hereinafter, the construction of the rotation angle detection device according to this embodiment will be explained in detail based on FIG. 3 and FIG. 4.

In this rotation angle detection device, the rectangular-shaped permanent magnet 10 is fixedly attached to the one-side end face of the shaft 9 in such a manner that the central axis of the shaft 9 coincides with a neutral axis between an N pole and an S pole of the permanent magnet 10. The first guide member 11a having the same cross-sectional shape as that of the permanent magnet 10 is fixedly attached at its one end face to the S pole side of the permanent magnet 10, and the second guide member 11b having the same cross-sectional shape as that of the permanent magnet 10 is fixedly attached at its one end face to the N pole side of the permanent magnet 10. The one pair of first guide member 11a and the second guide member 11b, which serve to form a magnetic circuit so as to guide magnetic flux and suppress the leakage thereof, have their tip ends 11a1, 11b1 formed into hook-shaped configurations, respectively, between which the first magnetoresistive member 12a and the second magnetoresistive member 12b are arranged in such a manner that the respective central axes of the first magnetoresistive member 12a and the second magnetoresistive member 12b coincide with the neutral axis of the permanent magnet 10. Accordingly, the distance or length of a space A between the first and second magnetoresistive members 12a, 12b and the tip end 11a1 of the first guide member 11a is equal to the distance or length of a space B between the first and second magnetoresistive members 12a, 12b and the tip end 11b1 of the second guide member 11b.

In addition, the first and second magnetoresistive members 12a, 12b are arranged away from the permanent magnet 10 at a distance of 1.5 to 2 times the height b of the permanent magnet 10 in the axial direction of the shaft 9.

Moreover, the first and second magnetoresistive members 12a, 12b are arranged within the height of each of the spaces A, B which is 1.5 or less times the thickness a of each of the tip ends of the first and second guide members 11a, 11b with which the flow of magnetic flux is most stabilized.

In the intake air control apparatus as constructed above, when the driver depresses an accelerator pedal (not shown), a signal representative of the opening (i.e., the amount of depression) of the accelerator pedal is input from an accelerator opening sensor (not shown) to an unillustrated engine control unit (hereinafter referred to as "ECU"). The ECU energizes the drive motor 1 so that the output or rotating shaft 2 of the drive motor 1 is driven to rotate so as to move the throttle valve 20 to a prescribed degree of opening. Additionally, in accordance with the rotation of the output shaft 2 of the drive motor 1, the intermediate gear 4 and the final spur gear 5 are driven to rotate, whereby the shaft 9 integral with the final spur gear 5 is driven to rotate through a prescribed rotational angle. As a result, the throttle valve 20 is rotated to, and held at, the prescribed rotational angle in an intake passage formed in the body 7.

Figure 5:
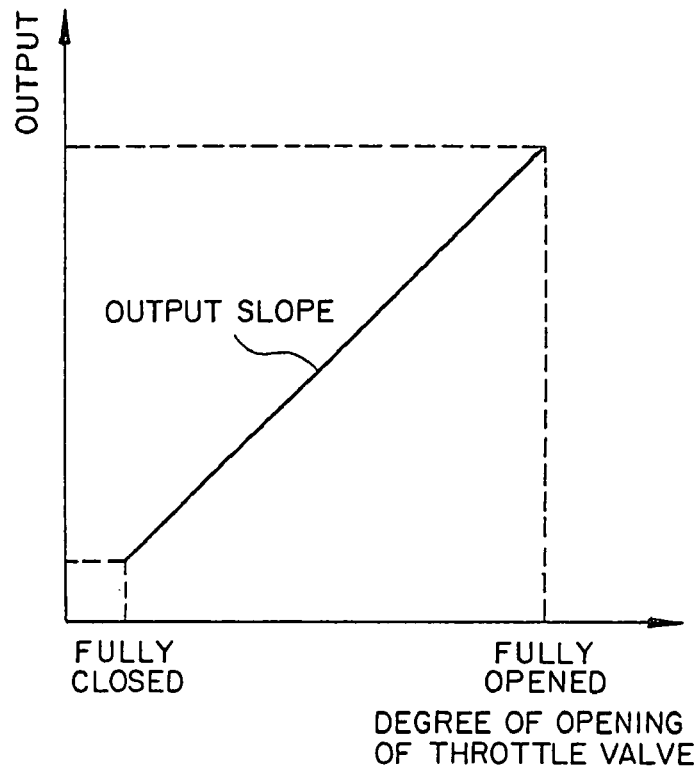
FIG. 5 is a view showing the relation between a throttle valve and the output of the rotation angle detection device shown in FIG. 1.

On the other hand, the first magnetoresistive member 12a and the second magnetoresistive member 12b of the magnetic flux azimuth sensing type detect the azimuth of the lines of magnetic flux emanating from the permanent magnet 10 rotating integrally with the shaft 9, and generate corresponding output signals. After the output signals from the first magnetoresistive member 12a and the second magnetoresistive member 12b are subjected to arithmetic processing by the first arithmetic circuit member 13a and the second arithmetic circuit member 13b, respectively, they are sent as throttle opening signals to the ECU through output terminals 13a1, 13b1, so that based on the throttle opening signals, the ECU determines how much fuel to inject into cylinders of the engine. The operating range θ of the magnetic flux is a range from 0°, at which the throttle valve 20 is fully closed, to 90°, at which the throttle valve 20 is fully opened. In this operating range, each of the first magnetoresistive member 12a and the second magnetoresistive member 12b has linear response, as shown in FIG. 5.

Figure 3:
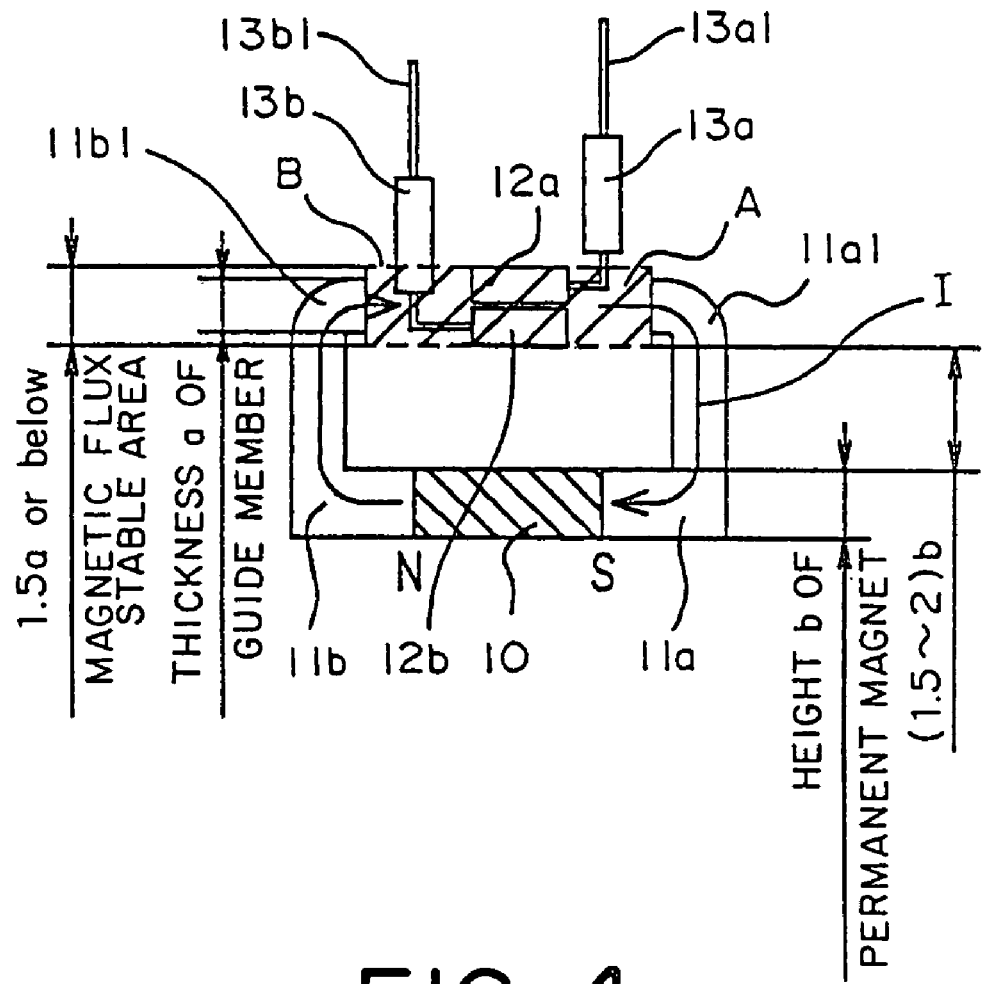
FIG. 3 is a side elevational view of the rotation angle detection device of FIG. 2.
Figure 4:
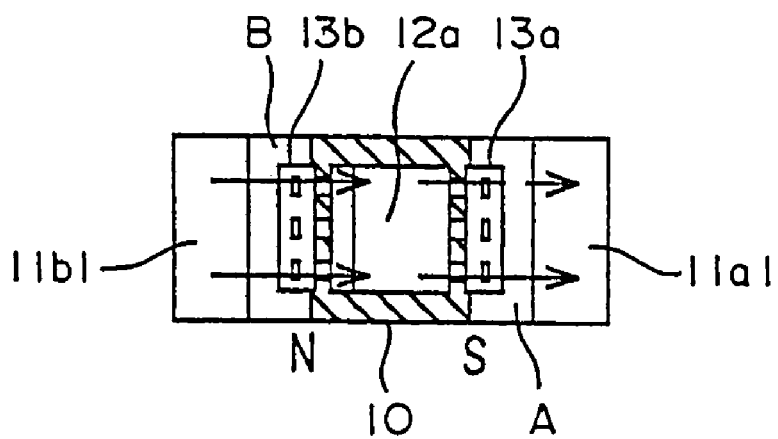
FIG. 4 is a plan view of the rotation angle detection device of FIG. 2.

In the rotation angle detection device of the intake air control apparatus as constructed above, the magnetic flux emanating from the permanent magnet 10 flows in the direction of arrow I in FIG. 3 along a magnetic circuit which is formed by the N pole of the permanent magnet 10, the second guide member 11b, the space B, the first and second magnetoresistive members 12a, 12b, the space A, the first guide member 11a and the S pole of the permanent magnet 10, so that the majority of the magnetic flux generated by the permanent magnet 10 passes through the first and second magnetoresistive members 12a, 12b. As a result, there is no need to enlarge the permanent magnet 10 unnecessarily, thus making it possible to reduce the size and cost thereof. In addition, the influence of leakage flux on peripheral parts can be suppressed.

Moreover, the first and second magnetoresistive members 12a, 12b are disposed at positions where the space A is equal in dimensions to the space B, so it is possible to accurately detect a change in the azimuth of the magnetic flux with respect to clockwise and counterclockwise rotational fluctuations of the shaft 9.

Further, since the first and second magnetoresistive members 12a, 12b are arranged away from the permanent magnet 10 at a distance of 1.5 to 2 times the height b of the permanent magnet 10 in the axial direction of the shaft 9, they can resist being influenced by the minute magnetic flux that leaks directly from the N pole to the S pole of the permanent magnet 10 without passing through the magnetic circuit.

Furthermore, the first and second magnetoresistive members 12a, 12b are arranged within the height of each of the spaces A, B which is 1.5 or less times the thickness of each of the first and second guide members 11a, 11b with which the adjacent lines of magnetic flux are parallel with one another and hence the flow of magnetic flux is most stabilized. As a result, the stable magnetic flux can be detected.

Embodiment 2

Figure 6:
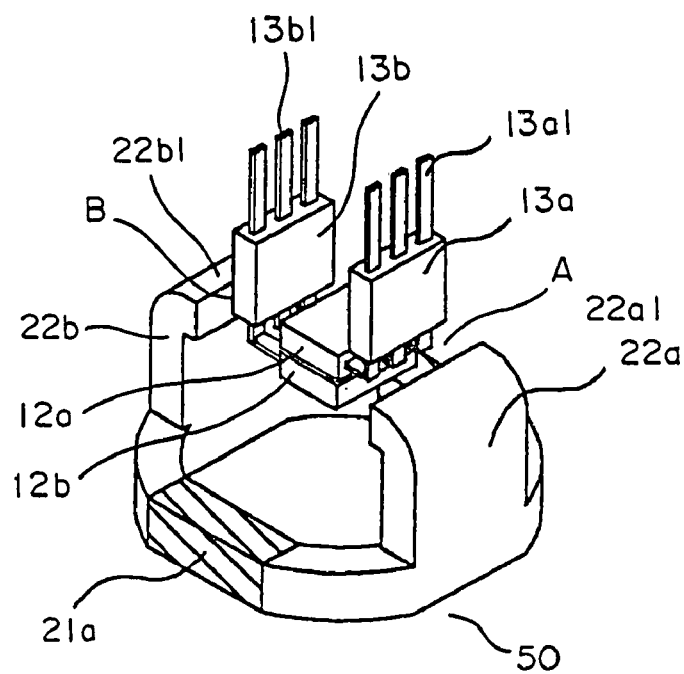
FIG. 6 is a perspective view showing a rotation angle detection device according to a second embodiment of the present invention.
Figure 7:
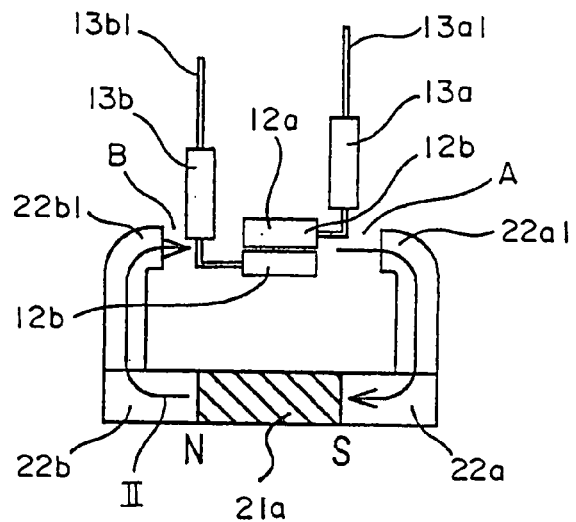
FIG. 7 is a side elevational view showing the rotation angle detection device of FIG. 6.
Figure 8:
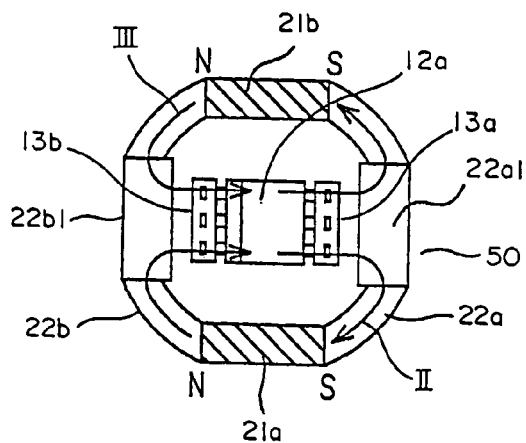
FIG. 8 is a plan view showing the rotation angle detection device of FIG. 6.
Figure 9:
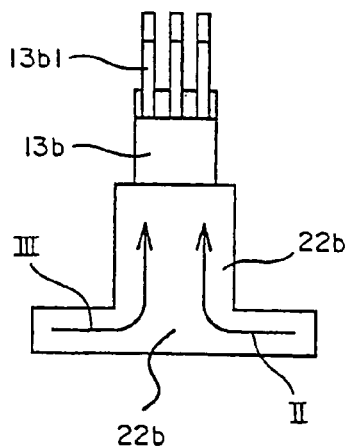
FIG. 9 is a view of the rotation angle detection device of FIG. 6 when seen from the rear side of a second guide member.

FIG. 6 is a perspective view that shows a rotation angle detection device according to a second embodiment of the present invention. FIG. 7 is a side elevational view that shows the rotation angle detection device of FIG. 6. FIG. 8 is a plan view that shows the rotation angle detection device of FIG. 6. FIG. 9 is a side elevational view of the rotation angle detection device of FIG. 6 when seen from the rear side of a second guide member.

In this second embodiment, a first guide member 22a, having a substantially arc shape when viewed along the axis of a shaft 9, and a second guide member 22b of the same shape as that of the first guide member 22a are arranged in opposition to each other through a first permanent magnet 21a and a second permanent magnet 21b interposed therebetween. That is, the S pole end faces of the first permanent magnet 21a and the second permanent magnet 21b are fixedly attached to the opposite end faces of the first guide member 22a, respectively, and the N pole end faces of the first permanent magnet 21a and the second permanent magnet 21b are fixedly attached to the opposite end faces of the second guide member 22b, respectively, whereby a rotating main body 50 having a circular shape as a whole is formed.

A first magnetoresistive member 12a and a second magnetoresistive member 12b are arranged between the respective hook-shaped tip ends 22a1, 22b1 of the one pair of the first guide member 22a and the second guide member 22b which serve to guide magnetic flux and suppress the leakage thereof. The respective central axes of the first magnetoresistive member 12a and the second magnetoresistive member 12b coincide with a central axis of the rotating main body 50.

Accordingly, the distance or length of a space A between the first and second magnetoresistive members 12a, 12b and the tip end 22a1 of the first guide member 22a is equal to the distance or length of a space B between the first and second magnetoresistive members 12a, 12b and the tip end 22b1 of the second guide member 22b.

In the rotation angle detection device of this second embodiment as constructed above, the magnetic flux emanating from the first permanent magnet 21a flows in the direction of arrow II in FIG. 8 along a magnetic circuit which is formed by an N pole of the first permanent magnet 21a, the second guide member 22b, the space B, the first and second magnetoresistive members 12a, 12b, the space A, the first guide member 22a and an S pole of the first permanent magnet 21a, so that the majority of the magnetic flux generated by the first permanent magnet 21a passes through the first and second magnetoresistive members 12a, 12b.

In addition, the magnetic flux emanating from the second permanent magnet 21b flows in the direction of arrow III in FIG. 8 along a magnetic circuit which is formed by an N pole of the second permanent magnet 21b, the second guide member 22b, the space B, the first and second magnetoresistive members 12a, 12b, the space A, the first guide member 22a and an S pole of the second permanent magnet 21b, so that the majority of the magnetic flux generated by the second permanent magnet 21b passes through the first and second magnetoresistive members 12a, 12b.

According to the rotation angle detection device of this second embodiment as constructed above, the majority of the magnetic fluxes generated by the first permanent magnet 21a and the second permanent magnet 21b pass the first and second magnetoresistive members 12a, 12b without leaking to the outside thereof, and hence there is no need to enlarge the first and second permanent magnets 21a, 21b unnecessarily, thus making it possible to reduce the size and cost thereof. Additionally, the influence of leakage flux on peripheral parts can be suppressed.

Moreover, a necessary detection range of a rotating member 30 to be described later is set to be smaller than a detectable range of each of the first and second magnetoresistive members 12a, 12b, so that the median value of the detectable range of each of the first and second magnetoresistive members 12a, 12b can correspond to the median value of the necessary detection range of the rotating member 30. As a consequence, the output of each of the first magnetoresistive member 12a and the second magnetoresistive member 12b becomes the most stable within the detectable range of the rotation angle detection device, thus making it possible to ensure linearity of the output.

Figure 10:
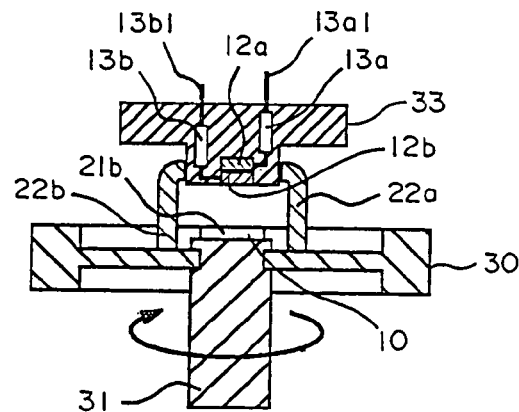
FIG. 10 is a cross sectional side elevational view showing the rotation angle detection device of FIG. 6 when built into a rotating member.
Figure 11:
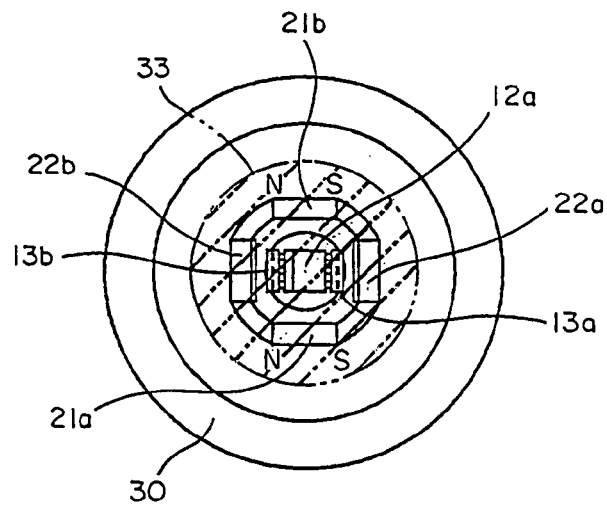
FIG. 11 is a plan view of the rotation angle detection device of FIG. 10.
Figure 12:
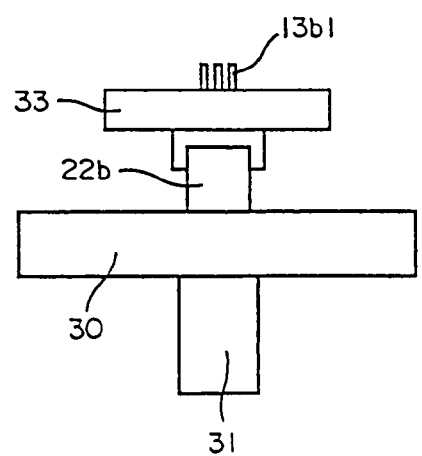
FIG. 12 is a view showing the rotation angle detection device of FIG. 10 when seen from the second guide member.

Further, in this rotation angle detection device, as shown in FIG. 10 through FIG. 12, the rotating main body 50 is fixedly mounted on the rotating member 30 in such a manner that the central axis of the rotating main body 50 coincides with the central axis of the rotating member 30, and an end portion of a rotation shaft 31 is then inserted into and fixedly caulked to a central portion of the disk-shaped rotating member 30, whereby the rotating main body 50 can be assembled into the rotating member 30 and the rotation shaft 31 in an easy and simple manner. Here, note that in this example, the first and second magnetoresistive members 12a, 12b and first and second arithmetic circuit members 13a, 13b are insert molded with a molding member 33.

Embodiment 3

Figure 13:
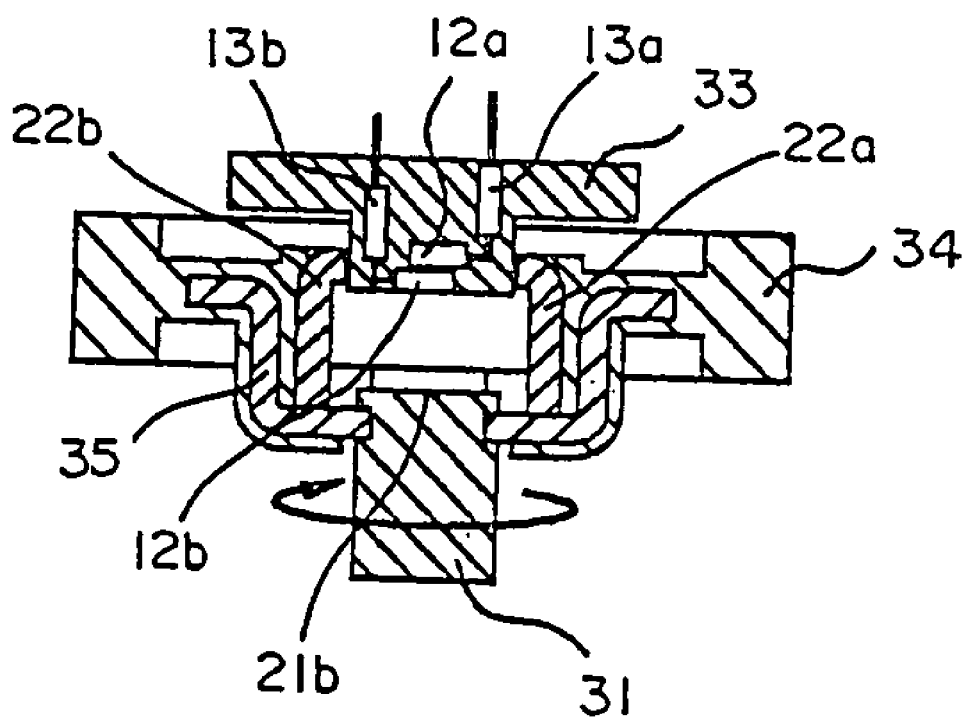
FIG. 13 is a cross sectional side elevational view showing a rotation angle detection device according to a third embodiment of the present invention.

FIG. 13 is a cross sectional side view that shows a rotation angle detection device according to a third embodiment of the present invention.

In this third embodiment, a gear 34 is formed by insert molding a cup-shaped plate 35 made of a non-magnetic material (for example, austenitic stainless steel) into a gear wheel member. The gear 34 is formed at its central portion with a concave portion in which the first and second guide members 22a, 22b and the first and second permanent magnets 21a, 21b are received.

Accordingly, since the rotation angle detection device of this third embodiment is enclosed by the cup-shaped plate 35 of the non-magnetic material, it is possible to reduce the influence of external magnetic field disturbances from the outside, thereby improving the reliability of the rotation angle detection device.

Here, it is to be noted that a rotation angle detection device according to the present invention can also of course be applied to a variety of kinds of apparatuses or mechanisms for detecting the angle of rotation of a rotating member, other than an intake air control apparatus for an engine for detecting the degree of opening of a throttle valve.

While the invention has been described in terms of preferred embodiments, those skilled in the art will recognize that the invention can be practiced with modifications within the spirit and scope of the appended claims.

What is claimed is:

1. A rotation angle detection device comprising:
   a permanent magnet fixedly secured to a rotating member, and having an S pole side face and an N pole side face;
   a first guide member having its one end face fixedly attached to the S pole side face of said permanent magnet;
   a second guide member having its one end face fixedly attached to the N pole side face of said permanent magnet, and having its tip end disposed in opposition to a tip end of said first guide member; and
   a magnetoresistive member disposed in a space formed between the tip end of said first guide member and the tip end of said second guide member, said magnetoresistive member being fixedly attached to a non-rotating member;
   wherein an angle of rotation of said rotating member is detected by detecting a change of the azimuth of magnetic flux, which is generated by said permanent magnet in said space, by means of said magnetoresistive member.

2. The rotation angle detection device as set forth in claim 1, wherein said first guide member and said second guide members have their tip ends which are of hook-shaped belt-like configurations, respectively, and which are the same shape.

3. The rotation angle detection device as set forth in claim 1, wherein said first guide member and said second guide member have their tip ends which are of hook-shaped configurations, respectively, and which are the same shape, and said first guide member and said second guide member are of substantially circular arcs, respectively, when viewed along an axis of said rotating member, and said permanent magnet comprises a first permanent magnet and a second permanent magnet respectively interposed between opposite end faces of said first guide member and opposite end faces of said second guide member which are disposed in opposition to each other.

4. The rotation angle detection device as set forth in claim 1, wherein said magnetoresistive member is disposed at a central portion of said space when viewed along an axis of said rotating member.

5. The rotation angle detection device as set forth in claim 2, wherein said magnetoresistive member is disposed in an area of said space which is 1.5 or less times the thickness of each of the tip ends of said first guide member and said second guide member in the axial direction of said rotating member.

6. The rotation angle detection device as set forth in claim 1, wherein said space is formed at a location away from said permanent magnet at a distance of 1.5 to 2 times the thickness of said permanent magnet in the axial direction of said shaft.

7. The rotation angle detection device as set forth in claim 1, wherein a necessary detection range of said rotating member is set to be smaller than a detectable range of said magnetoresistive member, and the median value of said detectable range of said magnetoresistive member corresponds to the median value of said necessary detection range of said rotating member.

8. The rotation angle detection device as set forth in claim 1, wherein said rotating member is a shaft fixedly secured to a throttle valve that adjusts the degree of opening in an intake passage, and said non-rotating member is a housing fixedly attached to a body that receives therein said throttle valve.

9. The rotation angle detection device as set forth in claim 8, wherein said magnetoresistive member is integrally formed with said housing by means of insert molding.

10. The rotation angle detection device as set forth in claim 1, wherein said magnetoresistive member comprises a first magnetoresistive member portion and a second magnetoresistive member portion, and said device further including a first arithmetic unit corresponding to said first magnetoresistive member portion and a second arithmetic unit corresponding to said second magnetoresistive member portion, wherein said first and second arithmetic units and said first and second magnetoresistive members are integrally formed as a unit.

* * * * *